Feb. 24, 1970     R. W. SARGENT     3,496,775
PRESSURE SENSING DEVICE
Filed Aug. 28, 1967

INVENTOR

RAYMOND SARGENT

BY *Edwin E. Greigg*

ATTORNEY

United States Patent Office 3,496,775
Patented Feb. 24, 1970

3,496,775
PRESSURE SENSING DEVICE
Raymond W. Sargent, Yorktown Heights, N.Y., assignor to Simmonds Precision Products Inc., Tarrytown, N.Y., a corporation of New York
Filed Aug. 28, 1967, Ser. No. 663,656
Int. Cl. G01l 7/20, 9/00
U.S. Cl. 73—384                                                 8 Claims

ABSTRACT OF THE DISCLOSURE

A pressure sensing system of the diaphragm capacitance type employing a housing filled with an incompressible dielectric liquid, and expansible chamber for biasing the diaphragm. An amplifier bridge circuit and rebalancing servo is connected to the diaphragm capacitor for controlling the movement of a bellows contained in the housing for varying the pressure therein in order to cancel any change between the interior pressure of the housing and the exterior pressure sensed by the diaphragm.

---

Figure 1:
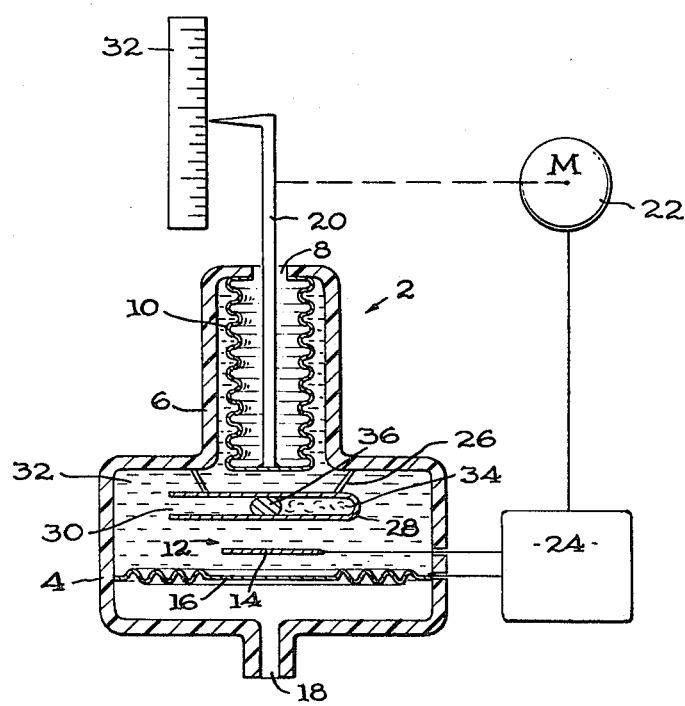

This invention relates to a pressure sensing system for detecting changes in altitude and more particularly to a closed system for detecting ambient pressure which exhibits high sensitivity and fast response and which is enclosed in a temperature independent single compact housing.

In the past, altitude sensing systems which employ direct measurement of the displacement of a diaphragm type capacitance element by regulating a compensating pressure in a separate volume for indicating a pressure change sensed by the diaphragm operated capacitance element have proved unsatisfactory under conditions requiring extremely high sensitivity over a wide operating range of altitudes. The inertia forces created by the necessary deflection of the diaphragm capacitance element and the corresponding volumetric change in a reference volume impede the overall response of such systems and contribute to inaccuracies of measurement. It is the purpose of this invention to overcome these defects by substantially reducing such inertia forces as well as the effects of temperature change. Accordingly, it is the object of this invention to provide a closed loop servo system for sensing minute pressure change on a compliant diaphragm.

It is another object of this invention to provide a pressure sensing system employing a closed loop servo means which utilizes a capacitance signal having infinite resolution.

It is yet another object of this invention to provide a pressure sensing system employing a single compact housing and having a minimum of moving parts.

It is still another object of this invention to provide a pressure sensing system utilizing a diaphragm operated capacitance element in cooperation with an inert dielectric non-compressible liquid having a self-contained elastic means for cooperation with the diaphragm of the capacitance element.

It is still a further object of this invention to provide a pressure sensing system which is temperature independent by having a uniform temperature gradient throughout.

According to one aspect of a system embodying the principles of this invention, there is provided a single compact housing containing a capacitor having one plate as a diaphragm exposed to atmospheric pressure, an inert dielectric non-compressible liquid, an expansible chamber containing a gas and a bellows extending within the housing for varying the pressure therein. Upon change of pressure the diaphragm of the capacitor undergoes a deflection which modifies an electrical signal to an amplifier, the output of which is utilized to energize a suitable servo system for moving the bellows to change the pressure within the container and restore the diaphragm to its original position. The expansible chamber, which has negligible hysteresis, is the sole source of elasticity within the system. Indication of the pressure change is then a function of the mechanical displacement of the servo actuated bellows.

Figure 2:
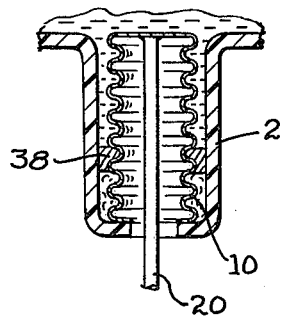

Other objects, features and advantages of this invention will become apparent from a detailed study of the following description and accompanying drawings, in which:

FIG. 1 illustrates in cross-section a preferred embodiment of this invention; and FIG. 2 illustrates a modification of the showing in FIG. 1 employing the principles of this invention.

Referring now to FIG. 1, there is shown the pressure sensing device in a compact housing 2 having a main chamber 4 and a stem portion 6. The housing may be molded of a suitable plastic material or constructed from a suitable metal. Extending within the stem portion 6 and depending from the periphery of an opening 8 in the stem is a bellow 10. In the chamber 4 is positioned a capacitive element 12 having a fixed electrode plate 14 and a diaphragm electrode plate 16 with the latter forming a bottom wall portion and exposed to atmospheric pressure by means of an extending throat portion 18. The diaphragm 16 is supported in a suitable manner from the side walls of the chamber 4 and the electrode plate 14 may be fixed to the side walls by suitable insulated strut or bracket means (not shown). Suitable leads extend from the plates 14, 16 through the chamber wall, as shown. The interior of the bellows 10 is secured to a pointer arm 20 which, in turn, is driven by a servo motor 22 energized from the amplifier bridge circuit 24 in response to a capacitive signal from the capacitor 12. The amplifier bridge circuit 24 is of conventional design, a detailed description of which may be found in U.S. Patent No. 2,981,105, issued to F. L. Ryder on Apr. 25, 1961. Housed within the center of the chamber 4 and supported from the upper portion thereof by suitable struts 26 is a horizontally oriented tube member 28 having an open end 30. The entire housing is filled with a non-compressible dielectric fluid 32, for example, silicone or the like, except for a portion of the interior of tube 28 which contains a suitable gas 34 for the purpose of providing the necessary elasticity for proper functioning of the diaphragm 16. To this end the gas 34 will expand or compress under the influence of ambient pressure transmitted by the incompressible fluid 32 from the diaphragm 16. The gas portion of the tube 28, in effect, will function as an expansible chamber and may be likened to a spring having negligible hysteresis. In order to insure against absorption of the gas by the fluid 32 present in the tube 28 there is provided a suitable fluid element, such as a mercury globule 36 acting as an axially slidable piston within the tube for separating the fluid 32 from the gas 34. It may be, however, that with a proper choice of fluid and gas absorption of one into the other can be avoided indefinitely thus eliminating the need for a separating element such as the mercury globule 36.

Because the system, according to this invention, is contained in a single compact housing with the trapped gas 34 in the tube 28 affording the necessary elasticity, any mechanical linkages attached to the system for pressure response or directly connected to the diaphragm are eliminated, thus resulting in a zero friction system. Consequently, neither the spring rate of the diaphragm 16 nor the spring rate of the bellows 10 needs ever be realized, since the former is always restored to its original position and the latter is mechanically connected to the pointer arm 20 of the servo mechanism which is unaffected by pressure variations.

The operation of the system according to this invention is as follows: Ambient pressure conditions act upon one side of the complaint diaphragm 16 and hence any deflection of this diaphragm will result in a capacitance change between the plates 14 and 16. This capacitance signal is imposed on the amplifier bridge circuit 24 which energizes the servo motor 22 to move the pointer arm 20 and reposition the bellows 10. The volume, and hence the pressure, within the chamber 4 is modified such that the displacement of the diaphragm 16 is once again restored to its original position. In this manner any difference between the external pressure and the internal pressure of the chamber 4 is cancelled and the system is rebalanced to its null condition.

FIG. 2 shows an alternate embodiment in which the housing is rotated 180° from the position shown in FIG. 1 to thereby orient the stem portion 6 at the bottom of the housing 2. In this position the gas 34 may occupy the lower portion of the stem 6 as shown. This arrangement eliminates the need for the tube member 28 for trapping the gas, as shown in FIG. 1. Further, as in the case of FIG. 1, the gas may be separated from the dielectric liquid by means of a ring of suitable fluid, such as mercury 38, for the same purpose as above described. If the system according to this invention is used as an altimeter in modern aircraft and thus subjected to constant attitude change, then the device shown in FIG. 1 is more suitable, since the trapped gas 34 would remain confined to a smaller container under changing attitude, namely, the horizontally oriented tube 28. Further, the length of the tube 28 is sufficient to contain the mercury globule 36 under conditions of maximum expansion of the gas 34.

With a completely enclosed liquid system afforded by the housing 2, the device according to this invention has good thermal conductivity which results in a uniform temperature gradient throughout. The device, however, can be thermally insulated and temperature compensated for errors that might normally occur due to the thermal coefficient of expansion of the fluid medium 32. However, these steps may or may not be employed depending upon the conditions in which the device is used and the degree of accuracy desired.

Although several embodiments of the invention have been depicted and described, it will be apparent that these embodiments are illustrative in nature and that a number of modifications in the apparatus and variations in its end use may be effected.

What is claimed is:

1. A system for detecting changes in ambient pressure comprising the combination of a housing, an incompressible fluid contained in an enclosure within said housing, means connected to said enclosure for varying the volume of said enclosure with variation of the pressure on the fluid, an expandable capacitive unit in contact with said fluid and forming a first wall portion of said enclosure, a bellows contained in said housing and forming another wall portion of said enclosure, means connected to said bellows for indicating the position of said bellows, means for applying said ambient pressure to said first wall portion to vary the capacitance of said capacitive unit by an amount dependent on changes in ambient pressure with respect to the internal pressure within said enclosure, means responsive to the variation of said capacitance for providing an electrical signal, feedback means responsive to said electrical signal for moving said bellows to vary the internal pressure on the fluid in said enclosure to balance said pressure changes, the position of said bellows indicating such changes.

2. A system for detecting changes in ambient pressure comprising in combination a housing, an incompressible fluid contained in an enclosure within said housing, means connected to said housing for varying the volume of said enclosure with variation of the pressure on the fluid, an expandable capacitive unit in contact with said fluid and forming a first wall portion of said enclosure, a bellows in contact with said fluid and forming a second wall portion of said enclosure, means connected to said bellows for indicating changes in ambient pressure, means electrically coupled to said capacitive unit for providing an electrical signal indicating changes in the external pressure with respect to the internal pressure of said housing, and feedback means responsive to said electrical signal for moving said bellows within said housing in a direction to cancel said pressure changes.

3. A system for detecting changes in ambient pressure comprising an expandable capacitive unit subject externally to said ambient pressure and internally to an opposing balancing pressure, an incompressible fluid under said internal pressure, an expansible chamber means surrounded by said incompressible fluid for biasing said expandable capacitive unit, means responsive to said internal pressure for indicating changes in ambient pressure, means coupled to said capacitive unit for providing an electrical signal indicating changes in said external pressure with respect to said internal pressure, and feedback means responsive to said electrical signal for adjusting said internal pressure in a direction to cancel said pressure changes.

4. A system for detecting changes in ambient pressure comprising a housing, an enclosure within the housing, an expandable capacitive unit forming a wall portion of said enclosure and subjected externally to said ambient pressure and internally to an opposing balancing pressure, an incompressible fluid contained in said enclosure under said internal pressure, an expansible chamber means contained in said enclosure for biasing said expandable capacitive unit, means responsive to said internal pressure for indicating changes in ambient pressure, means coupled to said capacitive unit for providing an electrical signal indicating changes in said external pressure with respect to said internal pressure, and feedback means responsive to said electrical signal for adjusting said internal pressure in a direction to cancel said pressure changes.

5. In a system according to claim 4, wherein said expansible chamber means comprises an elongated tube member having a closed end and partially filled with a gas, the other end of said tube being open for admitting said incompressible fluid.

6. In a system according to claim 5, wherein said tube contains a fluid means for separating said incompressible fluid from said gas.

7. A system for detecting changes in ambient pressure comprising in combination a housing, an enclosure within said housing, an incompressible fluid contained in said enclosure, an expandable capacitive unit in contact with said fluid and forming a first wall portion of said enclosure and subjected externally to said ambient pressure and internally to an opposing balancing pressure, a bellows in contact with said fluid and forming a second wall portion of said enclosure, means connected to said bellows for indicating changes in ambient pressure, an expansible chamber means contained in said enclosure for biasing said expandable capacitive unit, means electrically coupled to said capacitive unit for providing an electrical signal indicating changes in the external pressure with respect to the internal pressure of said enclosure, and feedback means responsive to said electrical signal for moving said bellows within said housing in a direction to cancel said pressure changes.

8. In a system according to claim 7, wherein said expansible chamber surrounds said second wall portion and is separated from said incompressible fluid by fluid means supported by said expansible chamber.

References Cited

UNITED STATES PATENTS 3,047,022  7/1962  Aldinger _____ 73—398

LOUIS R. PRINCE, Primary Examiner

DENIS E. CORR, Assistant Examiner

U.S. Cl. X.R.

73—398, 406, 410